(No Model.)

E. W. SUMMERS.
PAWL AND RATCHET MECHANISM FOR SEEDING MACHINES.

No. 394,085. Patented Dec. 4, 1888.

Witnesses,
Robt. Everitt,
Geo. W. Rea.

Inventor:
Edgar W. Summers.
By James L. Norris
Atty.

UNITED STATES PATENT OFFICE.

EDGAR W. SUMMERS, OF RICHMOND, INDIANA, ASSIGNOR TO THE HOOSIER DRILL COMPANY, OF SAME PLACE.

PAWL-AND-RATCHET MECHANISM FOR SEEDING-MACHINES.

SPECIFICATION forming part of Letters Patent No. 394,085, dated December 4, 1888.

Application filed July 19, 1888. Serial No. 280,388. (No model.)

*To all whom it may concern:*

Be it known that I, EDGAR W. SUMMERS, a citizen of the United States, residing at Richmond, in the county of Wayne and State of Indiana, have invented new and useful Improvements in Pawl-and-Ratchet Mechanism for Seeding-Machine Wheels, of which the following is a specification.

My invention relates to pawl-and-ratchet mechanism for seeding-machine wheels and mechanism of similar type; and the purpose thereof is to provide a simple and inexpensive construction and combination of parts whereby the pawl-and-ratchet mechanism used in connection with the ground-wheels shall be capable of application to either wheel without change, or, in other words, shall be capable of operation in both directions of rotation, whereby the same pawl and ratchet may be used upon either wheel in contradistinction to that construction in which the pawls take the ratchet in one direction and are inoperative in the other. It is my purpose, also, to provide a novel and inexpensive construction whereby the ratchet-case is supported upon the hub of the ground-wheel and better enabled to support the thrust of the pawls when severe strain is imposed upon the latter, and whereby also the play of the axle and the admission of dust and dirt within the ratchet-case are entirely or in great measure avoided.

To these ends the invention consists in the several novel features of construction and new combinations of parts hereinafter fully described, and then definitely pointed out in the claims.

Figure 1:
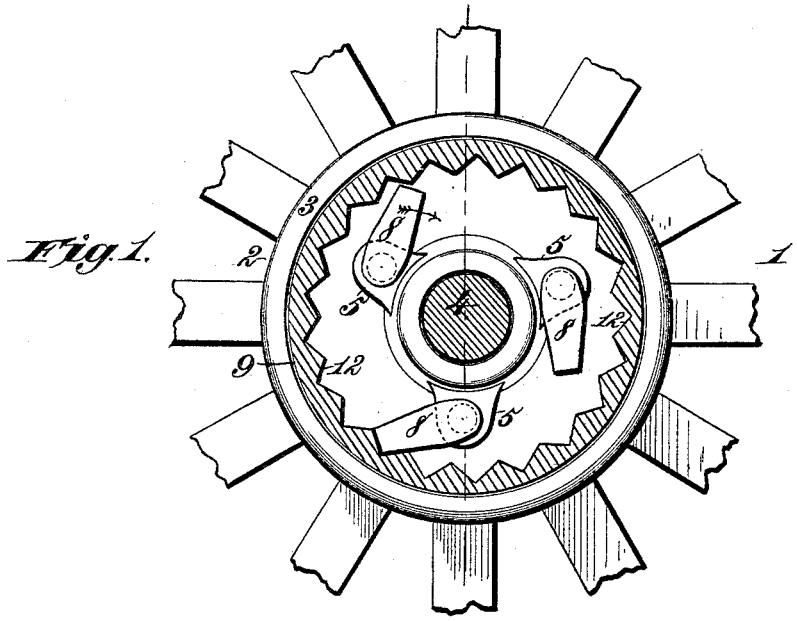
Figure 2:
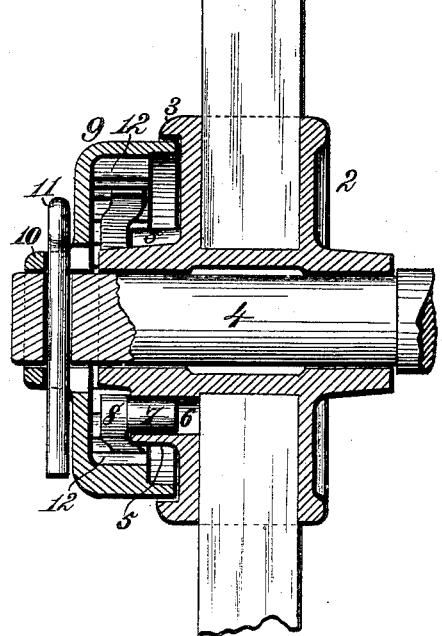
Figure 3:
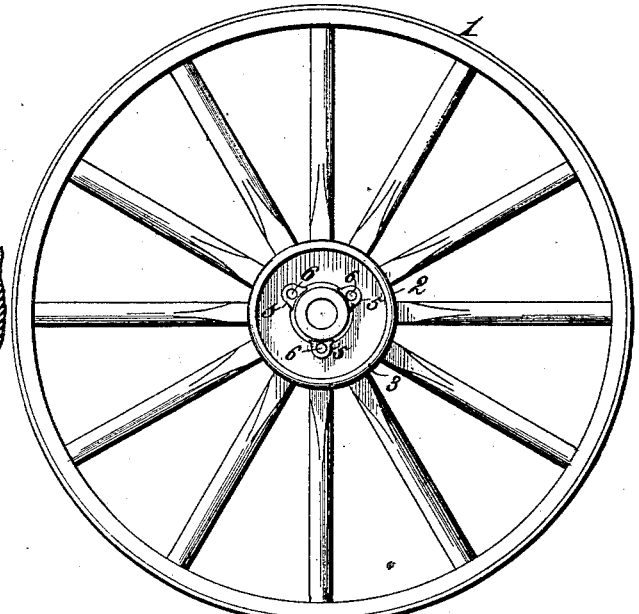

In the accompanying drawings, Figure 1 is a vertical transverse section taken through the ratchet-case outside the pawls. Fig. 2 is a vertical section taken in the axial line of the shaft of the ground-wheel. Fig. 3 is a front elevation of one of the ground-wheels, the pawls and ratchet-case removed.

In the said drawings the reference-numeral 1 designates one of the ground-wheels of a seeding-machine or other analogous structure. This wheel is provided with a hub, 2, having upon its outer face a circumferential flange or lip, 3, and provided with a central aperture within which the end of the shaft 4 has bearing. Upon the outer face of the hub 2, at substantially equal intervals, are formed bosses 5, preferably three in number, although I may use more or even less without essentially departing from my invention. In each boss is drilled or otherwise formed an opening, 6, which receives the pivot-pin or shank 7 of a pawl, 8. The three pawls used upon each wheel are counterparts one of another, each being formed with a square nose, the body of the pawl being straight, or practically so. In other words, a line drawn radially from the shaft through the center of the nose or outer end of the pawl will be substantially parallel to the two sides of the pawl, the end of which, being cut squarely off, forms an equal angle with each side or face.

Upon the end of the axle 4 is mounted a ratchet-case consisting of a cylindrical shell, 9, comprising an inwardly-turned flange, which just fits within the flange or lip 3 of the hub, and said shell is provided with a central opening to receive the end of the shaft 4. This opening is surrounded by an outwardly-projecting flange, 10, having space to admit a key, 11, by which the ratchet-case is rigidly connected to the shaft. The lateral flange or part of the shell 9 which projects under the annular flange 3 is provided on its inside with a series of V-shaped notches, 12—that is to say, notches substantially rectangular in cross-section—the walls or sides of each of which diverge toward the axle 4 and serve as abutments for the pawls 8, each of which latter can be reversed by swinging it from one side to the other side of a radial line drawn from the center of the axle through the pivot of the pawl, so that the pawl can be caused to act by its nose upon either of the divergent walls or sides of the notches.

It will be seen from the construction set forth that the pawls will engage the ratchet in either direction of rotation of the wheel, and that the pawls and ratchet-case are applicable to either one of the two ground-wheels and may be rendered operative in either direction of rotation of either wheel by simply reversing the pawls by swinging them to one side or the other of the radial lines drawn through the pins on which said pawls swing.

The reversible pawls gravitate into engagement with the teeth formed by the rectangular notches as the pawls are brought below the axle by the revolution of the ground-wheel, and said pawls gravitate, as mentioned, at whichever side of the radial lines they are swung.

The ratchet-case fitting within the lip or flange 3 receives therefrom a strong support against the radial thrust of the pawls and aids in preventing the play of the axle, while at the same time it prevents the entrance of dust and dirt to the shaft-bearings and ratchet, and thereby greatly prolongs their duration.

What I claim is—

1. A supporting ground-wheel for a seeding-machine, having a hub, in combination with a ground-wheel axle, a shell fixed to the axle bearing against the hub and having an internal series of V-shaped notches, and a series of square-nosed pawls pivoted to the hub, reversible from one side to the other of radial lines drawn through the pawl-pivot from the center of the axle and gravitating into engagement with the notches as they are brought below the axle by the rotation of the ground-wheel on the surface traversed, substantially as described.

2. A supporting ground-wheel for a seeding-machine, provided with a hub having a series of bosses and a ground-wheel axle passing through the hub, in combination with a shell fixed to the axle, having an inwardly-turned flange bearing against the hub and provided with an internal series of V-shaped notches and a series of pawls pivoted to the hub, reversible from one side to the other of radial lines drawn through the pawl-pivots from the center of the axle and gravitating into engagement with the notches as they are brought below the axle by the rotation of the ground-wheel on the surface traversed, substantially as described.

3. A supporting ground-wheel for a seeding-machine, having a hub and a ground-wheel axle, in combination with a shell fixed to the axle and comprising an inwardly-turned flange having a series of V-shaped notches, and a series of square-nosed pawls pivoted to the hub of the ground-wheel, reversible from one side to the other of radial lines drawn through the pawl-pivots from the center of the axle and engaging the notches by the rotation of the ground-wheel on the surface traversed to permit the wheel to be used at either end of the axle, substantially as described.

4. A supporting ground-wheel for a seeding-machine, having a hub provided with the annular flange 3, in combination with the axle, the shell 9, fixed to the axle, having an inwardly-turned flange provided with V-shaped notches and projecting under said annular flange, and pawls pivoted directly on the hub and reversible from one side to the other of radial lines drawn through the pawl-pivots from the center of the axle, substantially as described.

In testimony whereof I affix my signature in presence of two witnesses.

EDGAR W. SUMMERS.

Witnesses:
HARRY LYNDE,
JOSEPH W. LAMSON.